Figure 3:
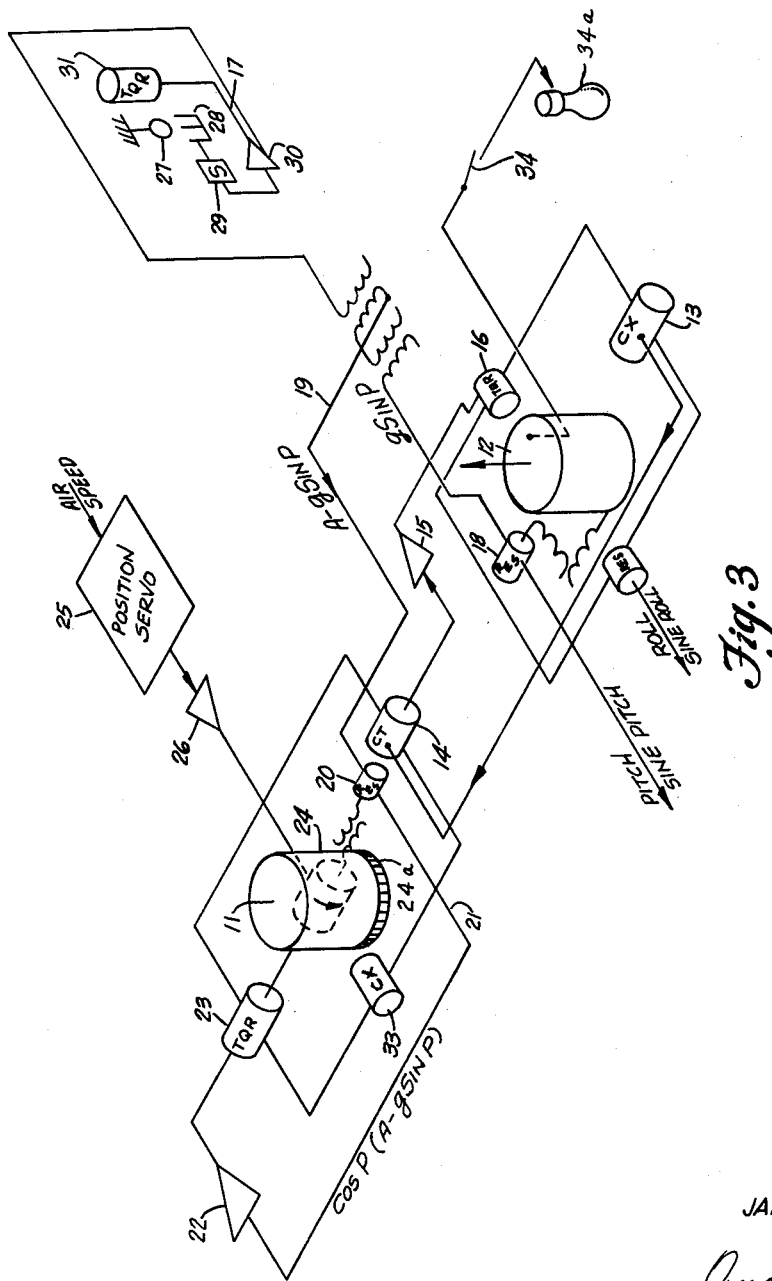

June 9, 1964     J. C. GEVAS     3,136,164
VERTICAL REFERENCE SYSTEM
Filed Feb. 26, 1960     2 Sheets-Sheet 1
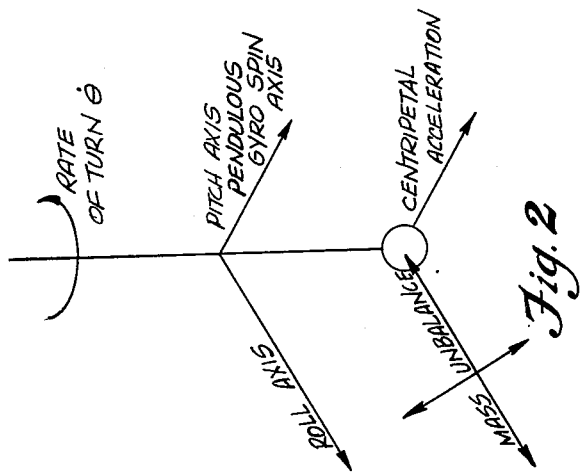
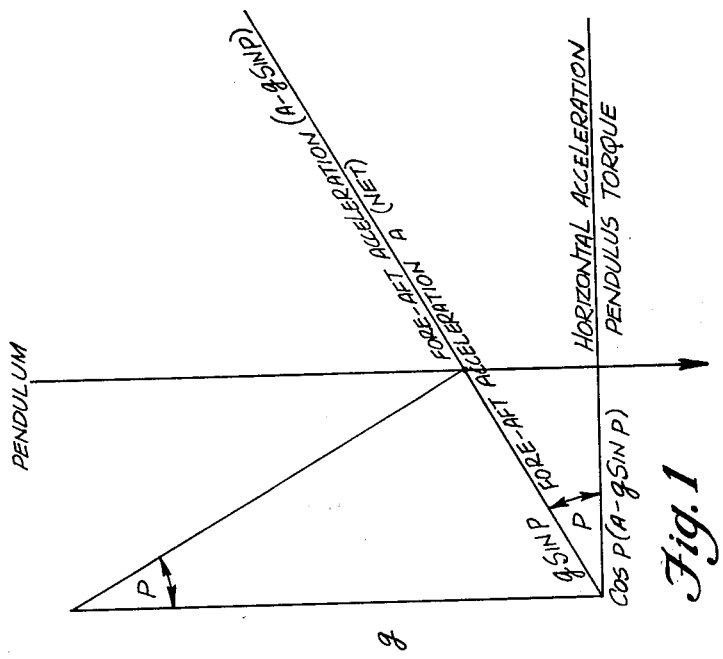
JAMES C. GEVAS
INVENTOR.
BY Andrew L. Bain
George B. Dupont
ATTORNEYS

United States Patent Office 3,136,164
Patented June 9, 1964

3,136,164
VERTICAL REFERENCE SYSTEM
James C. Gevas, Newark, N.J., assignor to General Precision, Inc., Little Falls, N.J., a corporation of Delaware
Filed Feb. 26, 1960, Ser. No. 11,351
6 Claims. (Cl. 74—5.37)

The present invention relates to a vertical reference system for use by aircraft, and more particularly to a vertical reference system which is self contained in the aircraft and requires no information from outside sources such as Doppler radar information.

It is well known that an aircraft vertical reference system includes the combination of a long term reference, e.g., a pendulum which is readily displaced from the vertical by any horizontal acceleration, but which will eventually return to giving a true vertical indication, and a short term reference, e.g., a gyro which will remain in the true vertical for a short time, but drifts from vertical for reasons well known in the art and already explained in considerable patent literature on the subject. The gyro element is therefore slaved to the pendulous element, and in this way, drift is prevented. In the case of aircraft take-off, the aircraft may be operating under acceleration conditions for an extended period of time. During this time, the pendulum will not indicate true vertical and the time period is long enough to cause the gyro to be slaved to the incorrect vertical reference. At present, during take-offs, Doppler radar may be used in the system for this time period. The aircraft must therefore carry this additional equipment, a minimum of about eighty pounds, and besides being costly, is far from satisfactory.

It has now been discovered that it is possible to keep the long term reference, or what has hereinbefore been called the pendulum, in true vertical during take-off in a self-contained system in the aircraft without the requirement of outside information such as Doppler radar information.

It is an object of the present invention to provide an aircraft vertical reference system.

It is a further object of the present invention to provide an aircraft vertical reference system which requires only the air speed as its source of information, or optionally, no external information.

Another object of the invention is to provide an aircraft vertical reference which is small, light, compact, and inexpensive to manufacture.

With the foregoing and other objects in view, the invention resides in the novel arrangement and combination of components and in the details of construction hereinafter described and claimed, it being understood that changes in the precise embodiment of the invention herein disclosed may be made within the scope of what is claimed without departing from the spirit of the invention. The advantages of the invention will become apparent from the following description taken in conjunction with the accompanying drawing in which:

FIGURE 1 graphically illustrates the component forces and the resultant forces caused by said components during the fore-aft acceleration of an aircraft on a pendulum in said aircraft;

FIGURE 2 depicts the results of centripetal acceleration on a pendulum in an aircraft during an aircraft turn; and FIGURE 3 is a somewhat schematic and diagrammatic explanation of the invention herein contemplated which will provide an aircraft vertical reference.

Error in indicating true vertical by the vertical reference system results from two fundamental causes; fore-aft acceleration, and an aircraft turn. For the purpose of the present invention, any error due to Coriolis and east-west velocity around the earth's polar axis is disregarded, as such error will not exceed 1° for typical flight conditions. To better understand the operation of the invention, it is first necessary to visualize the problems which must be solved. Once this is understood, the operation of the various components of the device and their relation to the solution of the problem will become clear.

In the case of fore-aft acceleration, when acceleration is at a pitch angle $p$, there must be subtracted from the theoretical acceleration $A$, in order to obtain the true acceleration an amount equal to gravity multiplied by the sine of the pitch angle ($g \sin p$), as depicted in FIG. 1. It is however the force of the acceleration in the horizontal plane which is applied against the pendulum's sensitive axis. This force against the pendulum is equal to the true fore-aft acceleration multiplied by the cosine of the pitch angle, or, $H = \cos p \ (A - g \sin p)$. If the aircraft makes a turn, it experiences a centripetal acceleration equal to the product of the rate of turn of the aircraft about the instantaneous center of its turn, and its ground speed. If the centripetal acceleration forces the pendulum 45 degrees off true vertical about the roll axis, the pitch fore-aft acceleration compensation of the pendulous gyro would be in error by cosine 45°. Therefore, in addition to the compensation for fore-aft acceleration, additional compensation must be provided during the aircraft turn to counteract the effect of centripetal acceleration. This is done by creating a situation where the unbalance torque imposed on the pendulum about the roll axis by centripetal acceleration is opposed by a gyroscopic torque. As illustrated in FIG. 2, centripetal acceleration acts in such a direction as to force the pendulous gyro off true vertical by rotating it about an aircraft roll axis. Turning the gyro spin vector about the azimuth axis at a rate of $\dot{\theta}$ will cause a gyroscopic reaction torque $\dot{\theta} \times M$ (where $M$ is the gyro angular momentum about the aircraft roll axis). If the gyro motor is driven in the proper direction, the two torques will oppose each other. In order for the two torques to cancel each other, a situation is required where the gyroscopic reaction torque $\dot{\theta} \times M =$ (pendulum mass unbalance) $\times \dot{\theta} \times$ ground speed. $\dot{\theta}$ can then be eliminated from each side of the equation. The desired ratio between gyro angular momentum and pendulous mass unbalance can be supplied by proper design. The relation between the gyro angular momentum and ground speed is accomplished by varying the spin frequency of the synchronous gyro motor in proportion to ground speed. Precise results, although preferable are not essential since the compensation for the effect of centripetal acceleration to correct the pitch error need only be about 50% of the required compensation to make the effect thereof negligible.

Broadly stated therefore, this invention contemplates providing a separate long term pendulum reference, and a short term gyro reference. The gyro is slaved to the pendulum in pitch by slow reacting slaving means so that when the pendulum goes off true vertical, the gyro will continue to indicate true vertical for a short period of time. During this time, the error in the pendulum will be corrected and when the gyro does start reacting to the slaving means, the pendulum will again indicate true vertical. In roll, on the other hand, the gyro is loosely slaved to the pendulum, but freed therefrom during an aircraft turn while there is supplied to the pendulum a gyroscopic torque about equal and opposed to the unbalance torque imposed on the pendulum about the roll axis by centripetal acceleration resulting from the aircraft turn.

In carrying the invention into practice, in order to supply an aircraft vertical reference, there is provided in combination with a pendulum, having a gyro slaved thereto, first and second groups of components, designed to correct error due to fore-aft acceleration, and error caused by centripetal acceleration because of an aircraft turn; said first group comprising, an accelerometer that yields a theoretical aircraft acceleration, a first resolver adapted to give true acceleration therefrom, a second resolver adapted to provide horizontal acceleration from said true acceleration, torque means applied to said pendulum responsive to and opposed to said horizontal acceleration; said second group comprising a gyro motor designed to rotate said pendulum about the roll axis; means responsive to an input equivalent to the approximate aircraft speed, adapted to cause said motor to rotate in a direction and speed so as to cause a gyroscopic torque imposed on said pendulum resulting from centripetal acceleration; and switch means adapted to release said gyro from said pendulum during an aircraft turn.

In accordance with the preferred embodiment, there is provided a long term reference in the form of a pendulous gyro 11. A vertical gyro 12 is continuously slaved in roll to the pendulous gyro, e.g., the element acting as the pendulum 11, except during an aircraft turn during which the vertical gyro acts as a short term vertical reference. In pitch on the other hand, the gyro is slaved to pendulum 11 by slow reacting slaving means which include a control transmitter, referred to sometimes as a CX, 13, shown as being associated with the gyro 12, and a control transformer, known as a CT, 14, shown as being associated with the pendulum, the combination of these two components indicating the angular displacement between the pendulum and the gyro in pitch. This indication is fed to an amplifier 15 and applied to a roll axis torquer 16, the torque of which is applied to gyro 12 to again align it with pendulum 11 in pitch. Fore-aft acceleration is obtained from an accelerometer 17. Associated with gyro 12 is a sine-cosine resolver 18 adapted to provide the sine of the pitch angle with reference to gyro 12. This is a transformer arrangement well known in the art and shown schematically in the drawing. If the coupling of this type of resolver is parallel, the ratio of primary and secondary windings are such as to give the cosine of the pitch angle. If the windings are at right angles to each other as depicted schematically in the drawing between gyro 12 and resolver 18, the output of the secondary is the sine of the pitch angle. A value equal to $g \sin p$, $p$ being the pitch angle, is generated by resolver 18 which is adapted to multiply the input gravity $g$ by sine pitch, thus furnishing an electrical value which is applied as a bucking voltage, i.e., flowing in a direction contrary to the accelerometer output $A$ to obtain an output of $(A - g \sin p)$ 19. A second resolver 20 on the pendulum whose input is $(A - g \sin p)$ just obtained in circuit 19 generates the $\cos p(A - g \sin p)$ 21. This is the factor required, which when properly amplified by amplifier 22 can be used to actuate a pitch axis torquer 23 to apply a torque to pendulum 11 equal and opposite to the force caused by the fore-aft acceleration, eliminating the net effect on the pendulum caused by this acceleration. The essentially instantaneous correction of the pendulum error by components 17, 18, 20, 22 and 23 before gyro 12 can react to an error via the servo loop formed by elements 13, 14, 15 and 16 is a matter of proper design, particularly of the roll axis and pitch axis torquers.

To compensate for the centripetal acceleration it is necessary to vary the angular momentum of synchronous gyro motor 24 which forms part of pendulum 11. Since ground speed is not readily available, air speed is used as the input to a position servo 25 which controls the frequency and voltage of power amplifier 26, supplying power to motor 24. For most applications, air speed is not an accurate measure of ground speed. Fortunately, only 50% of the required compensation will make the effect of centripetal acceleration negligible on the pitch compensation so that the fact that the results are not mathematically correct does not affect the value of the compensation. It is also possible to eliminate position servo 25, in which case there is fed to the amplifier an average or estimated ground speed derived by other means known in the art, e.g., the mean of the maximum and minimum air speeds.

During an aircraft turn, the gyro is freed from the pendulum in roll by bubble switch 34 and the vertical reference is obtained therefrom. From the theoretical standpoint, either or both of resolvers 18 and 20 can be associated with the gyro, and, although this can be accomplished, in practice, the device is optimized mechanically with one resolver associated with each of the gyros.

Although the foregoing components, taken individually may in some cases be known in the art and commercially available, a description of these components will prove helpful in understanding the invention. The vertical gyro has two degrees of freedom of about 360° in roll and 85° in pitch. Accelerometer 17 usually includes a pendulum 27 over an E bridge 28; sensing means 29 associated with E-bridge 28 sense the acceleration. The sensed output is amplified in an amplifier 30 and fed to a torquer 31. Pendulous gyro 11 has two gimbal axes, roll and pitch. The outer gimbal is the roll gimbal, and has the pitch axis suspended within it, as shown in the drawing. The pitch axis shaft has a gyro motor 24, and a pendulous mass 24a suspended therefrom. The stator of the motor is secured to the pitch axis shaft and the rotor of the motor rotates about the pitch axis shaft. The roll gimbal is suspended in bearings on the pendulous gyro outer frame, which is bolted to the airframe. Because of the suspended mass, the entire roll gimbal including the suspended pitch axis hardware, is pendulous about the roll and pitch axes. The pendulous displacement in roll as well as aircraft roll are sensed by a roll axis synchro 33 whose rotor is secured to the roll axis shaft, and whose stator is secured to the pendulous gyro outer frame. In connection with the power amplifier 26, it is advantageous to provide for the addition of capacitance for gyro motor tuning to ease the electronics design. The capacitance addition may be performed by cam actuated switches in position servo 25. The entire system includes a bubble switch 34 electrically connected to the vertical gyro to indicate by light 34a when the system is in error by more than about two degrees, as well as to cut off roll slaving of gyro 12 to pendulum 11 when in turns. The operation of the position servo, also known as a positional servomechanism has been described in technical literature, e.g., Brown and Campbell, "Principles of Servomechanisms," John Wiley & Sons, N.Y., 1948, pages 42 to 48. The control transmitter and control transformer, known as a CX and CT usually comprise a coil primary and "Y" secondary which connects with a "Y" primary having a coil secondary. Any change in either of the rotors with regard to their angular relationship to the corresponding coil will of course affect the voltage and current in the coil thus giving an electrical measure proportional to the relative displacement between the two rotors. To make the explanation of the invention more vivid, the term pendulum has been used in the present specification where the drawing shows a pendulous gyro, and the simple term gyro has been used instead of vertical gyro or vertical gyroscope. In actual construction of the device, the disposition of the components may differ from the positions shown in the drawing. The coil coupling at right angles for resolver 18 and parallel for resolver 20 should take place inside the resolver, of course, and not on the outside as shown in the drawing.

It is to be observed therefore, that the present invention provides for an aircraft vertical reference system, comprising, in combination; a pendulous gyro 11 having two degrees of freedom, including a gyro element and a pendulous mass attached thereto; a vertical gyro 12 slaved in roll to said pendulous gyro; a control transmitter 13 associated with one of said gyros, and a control transformer 14 associated with the other of said gyros, the combination of these two elements indicating angular displacement between said gyros in pitch; a first amplifier 15 amplifying said angular indication; a roll axis torquer 16 responsive to said amplified indication, associated with said vertical gyro 12 applying a torque thereto equal and opposed to the tendency of said vertical gyro to have an angular displacement from said pendulous gyro; an accelerometer 17, including a pendulum 27 over an E bridge 28, sensing means 29, and torquer 31, adapted to provide an electrical value corresponding to fore-aft acceleration; a first resolver 18, having a transformer coupling with one of said gyros, the coupling coils on said transformer being normally at right angles to each other, providing the sine of the pitch angle of the aircraft, which first resolver multiplies said pitch angle sine by an amount equivalent to the force of gravity, and applies said product as an electrical value in a direction opposed to the direction of flow of the electrical value corresponding to said fore-aft acceleration thus performing the operation of subtracting gravity multiplied by the sine of the pitch angle from fore-aft acceleration 19; a second resolver 20 having a transformer arrangement where the coils are normally parallel to each other associated with one of said gyros, said second resolver thus providing an electrical value representing the cosine of the pitch angle, and multiplying said pitch angle cosine by the output of the first resolver, providing as a product 21 of said second resolver an electrical value representing the horizontal acceleration; an amplifier 22 adapted to amplify said horizontal acceleration value to a usable power value; a pitch axis torquer 23 associated with said pendulous gyro, adapted to convert the electrical power supplied by said amplifier into a mechanical torque about the pendulous gyro pitch axis in a direction and of a magnitude sufficient to counteract the effect of said foreaft acceleration on the pendulum of said pendulous gyro; a synchronous motor 24 in said pendulous gyro 11; a position servo 25 responsive to air speed, including an amplifier 26 adapted to control the speed of said synchronous motor so as to cause said pendulous gyro to exert a gyroscopic torque equal and opposed to the force of centripetal acceleration on said pendulous gyro resulting from an aircraft turn; and switch means 34 adapted to release the vertical gyro from the pendulous gyro in roll during an aircraft turn.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:
1. In an aircraft vertical reference system having a vertical gyro and a pendulous gyro, and slow reacting servo means slaving said vertical and pendulous gyros in pitch; the improvement therein comprising in combination, an accelerometer; a first resolver, having a transformer coupling with one of said gyros, the coupling coils on said transformer being normally at right angles to each other, providing the sine of the pitch angle of the aircraft and multiplying said pitch angle sine by an amount equivalent to the force of gravity, and applies said product as an electrical value in a direction opposed to the direction of flow of the electrical value corresponding to said fore-aft acceleration thus performing the operation of subtracting gravity multiplied by the sine of the pitch angle from fore-aft acceleration; a second resolver having a transformer arrangement where the coils are normally parallel to each other associated with one of said gyros, said second resolver thus providing an electrical value representing the cosine of the pitch angle, and multiplying said pitch angle cosine by the output of the first resolver, providing as a product of said second resolver an electrical value representing the horizontal acceleration; a pitch axis torquer associated with said pendulous gyro, adapted to convert said electrical value representing horizontal acceleration into a mechanical torque about the pendulous gyro pitch axis in a direction and of a magnitude sufficient to counteract the effect of said fore-aft acceleration on the pendulum of said pendulous gyro; a synchronous motor in said pendulous gyro, and; synchronous motor control means controlling the speed of rotation of said motor, said motor control means being responsive to an input equivalent to the approximate aircraft speed, and causing said motor, in response to said input to rotate at a speed designed to cause a gyroscopic torque equal and opposed to any unbalance torque imposed on said pendulous gyro by centripetal acceleration.

2. A device as claimed in claim 1, said synchronous motor control means including, a position servo responsive to air speed, and, an amplifier receiving an input from said position servo which is fed to said synchronous motor controlling said motor speed.

3. A device as claimed in claim 1, said accelerometer including a pendulum over an E-bridge, sensing means, associated with the E-bridge, an amplifier receiving the sensed output of said sensing means and a torquer fed by said amplifier.

4. A device as claimed in claim 1, said pitch slaving means including a control transmitter associated with one of said gyros, a control transformer associated with the other of said gyros, the combination of these two control elements indicating angular displacement between said gyros in pitch; amplifier means amplifying said angular indication; and, a roll axis torquer responsive to said amplified indication, associated with said vertical gyro applying a torque thereto equal and opposed to the tendency of said vertical gyro to have an angular displacement from said pendulous gyro.

5. A device claimed in claim 4, with the proviso that at least one of said first or second resolvers must be associated with said vertical gyro.

6. A device claimed in claim 5, said sine resolver being associated with said vertical gyro, said cosine resolver being associated with said pendulous gyro.

References Cited in the file of this patent
UNITED STATES PATENTS

| 2,608,867 | Kellogg et al. | Sept. 2, 1952 |
| 2,758,478 | Fieux | Aug. 14, 1956 |
| 2,786,357 | Quermann et al. | Mar. 26, 1957 |